(12) United States Patent
Yoshio et al.

(10) Patent No.: US 7,626,804 B2
(45) Date of Patent: Dec. 1, 2009

(54) POWER STORAGE ELEMENT AND ELECTRIC DOUBLE LAYER CAPACITOR

(75) Inventors: Masaki Yoshio, 592-29, Oaza Honjo, Honjo-machi, Saga-shi (JP) 840-0027; Hitoshi Nakamura, Nagano (JP)

(73) Assignee: Masaki Yoshio, Saga (JP)

( * ) Notice: Subject to any disclaimer, the term of this patent is extended or adjusted under 35 U.S.C. 154(b) by 269 days.

(21) Appl. No.: 10/592,047

(22) PCT Filed: Jan. 21, 2005

(86) PCT No.: PCT/JP2005/000765

§ 371 (c)(1),
(2), (4) Date: Sep. 8, 2006

(87) PCT Pub. No.: WO2005/088658

PCT Pub. Date: Sep. 22, 2005

(65) Prior Publication Data

US 2007/0201185 A1    Aug. 30, 2007

(30) Foreign Application Priority Data

Mar. 10, 2004  (JP) .............................. 2004-067509
Apr. 16, 2004  (JP) .............................. 2004-121985

(51) Int. Cl.
    *H01G 9/00* (2006.01)
(52) U.S. Cl. ...................................... 361/502; 361/503
(58) Field of Classification Search ......... 361/502–503; 29/25.03; 252/62.2
    See application file for complete search history.

(56) References Cited

U.S. PATENT DOCUMENTS

| 6,489,026 | B1 | 12/2002 | Nishimura et al. |
| 6,710,999 | B2 * | 3/2004 | Kawasato et al. ........... 361/505 |
| 2003/0112580 | A1 * | 6/2003 | Reynolds et al. ........... 361/502 |

FOREIGN PATENT DOCUMENTS

| EP | 1191131 A1 | 3/2002 |
| JP | 60-182670 A | 9/1985 |
| JP | 63-215031 A | 9/1988 |
| JP | 02-054919 A | 2/1990 |
| JP | 05-139712 A | 6/1993 |
| JP | 09-320906 A | 12/1997 |
| JP | 2000-077273 A | 3/2000 |
| JP | 2001-180923 A | 7/2001 |
| JP | 2001-236960 A | 8/2001 |
| JP | 2002-151364 A | 5/2002 |
| JP | 2004-003097 A | 1/2004 |

* cited by examiner

*Primary Examiner*—Eric Thomas
(74) *Attorney, Agent, or Firm*—Harness, Dickey & Pierce, PLC

(57) ABSTRACT

To provide electric double layer capacitors which have large electrostatic capacitances. Graphite with a BET surface area of from 10 to 300 $m^2/g$, wherein the graphite has an energy storing ability of 10 to 200 mAh at a voltage of 1 V or more based on the oxidation-reduction potential of lithium.

10 Claims, 11 Drawing Sheets

[Fig. 1]
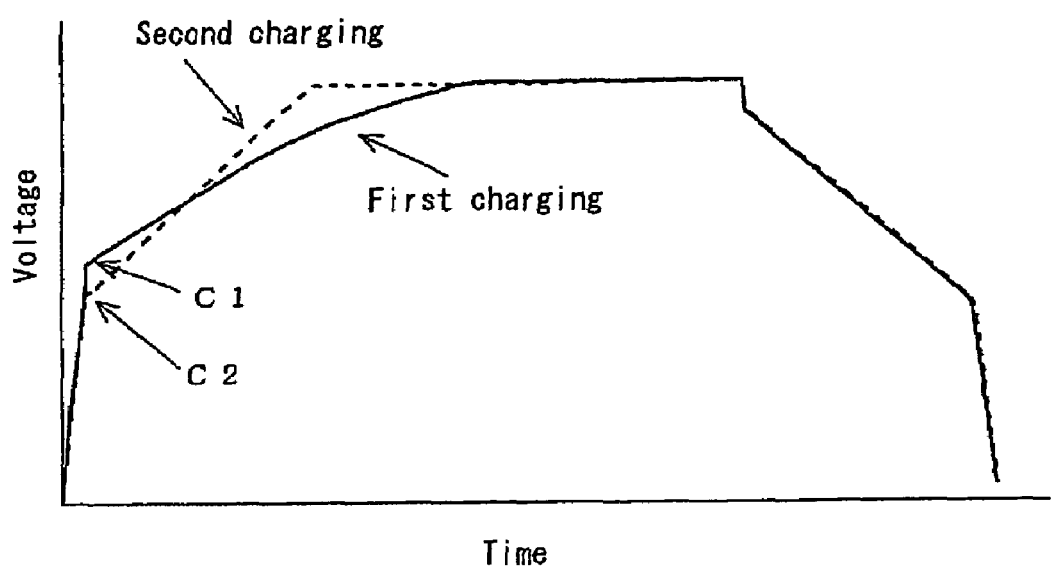
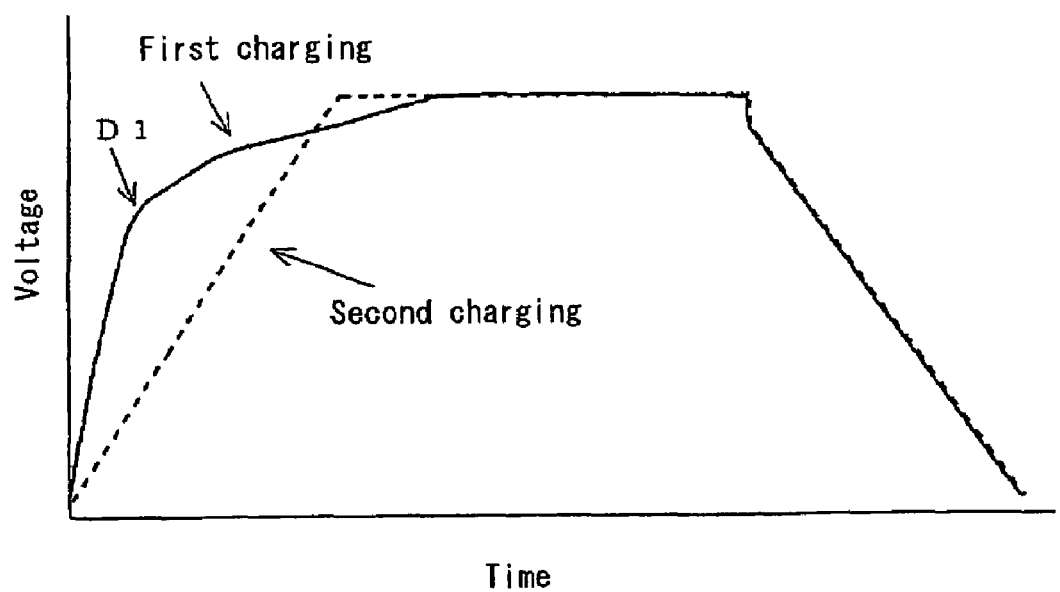

[Fig. 2]
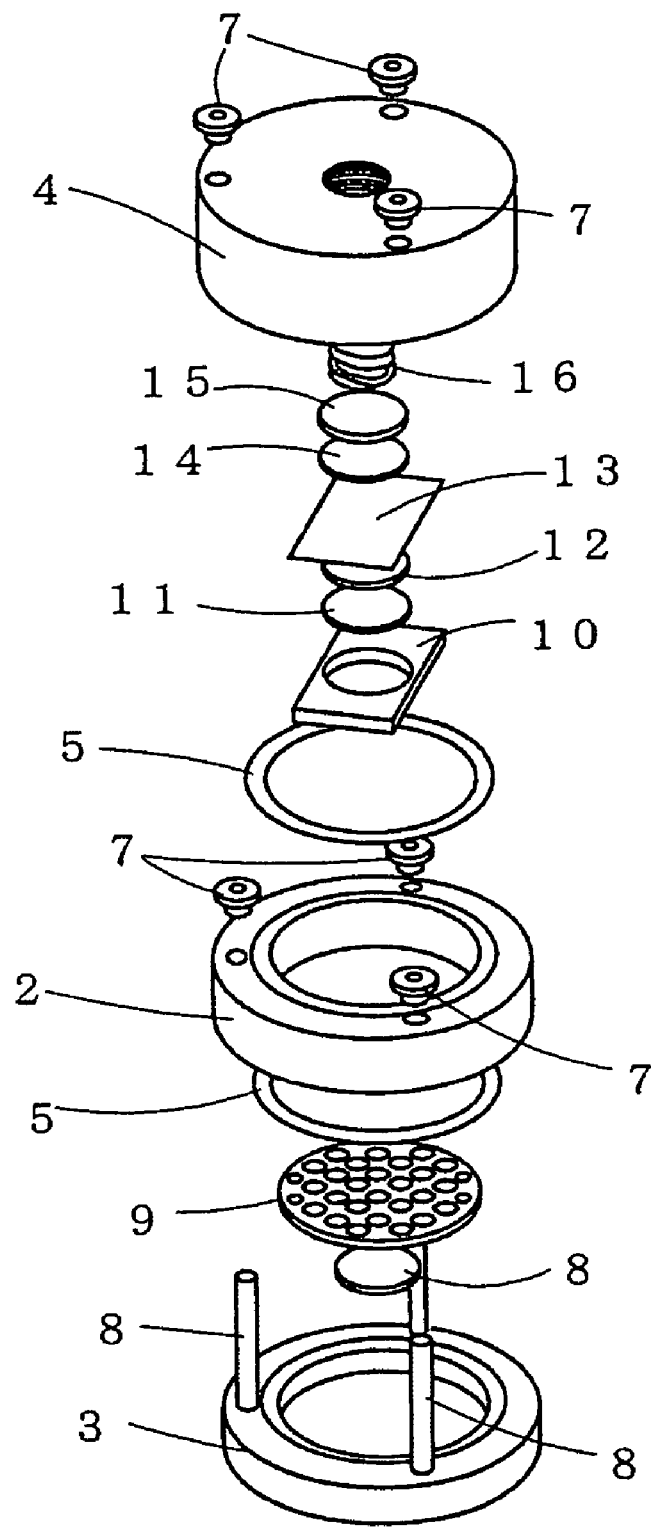

[Fig. 3]
(A)
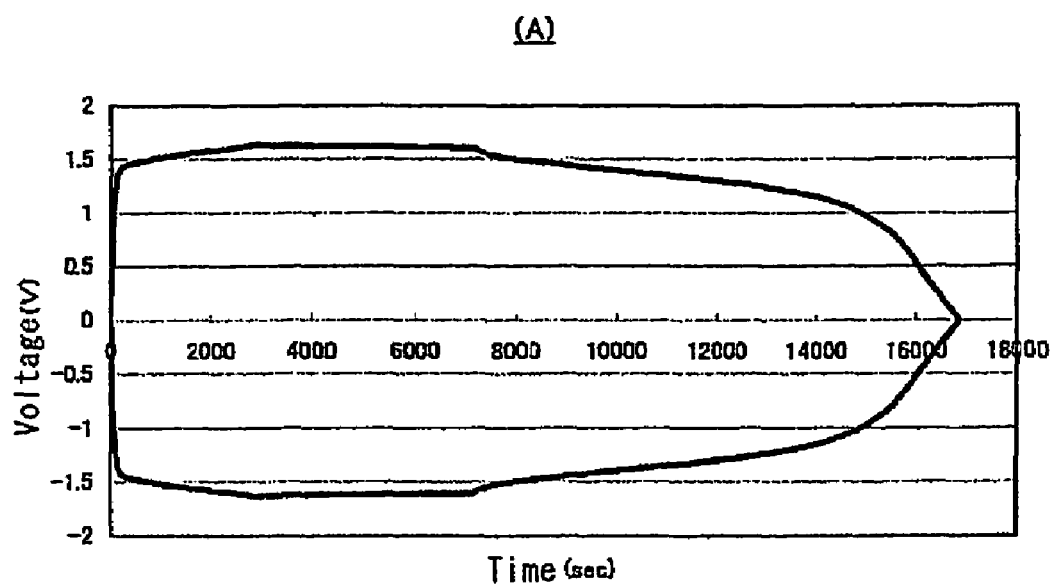
(B)
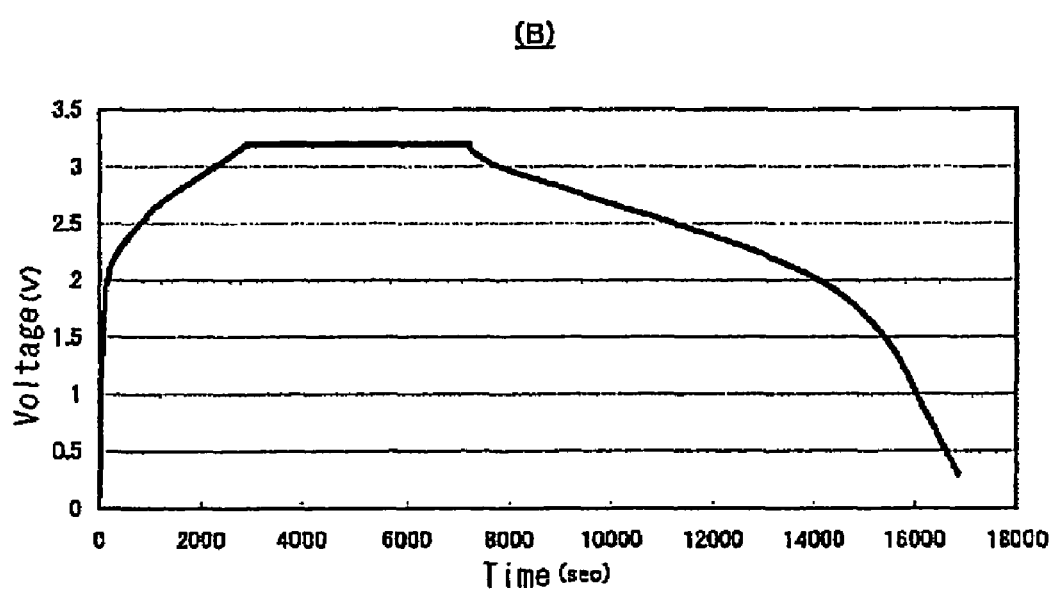

[Fig. 4]
(A)
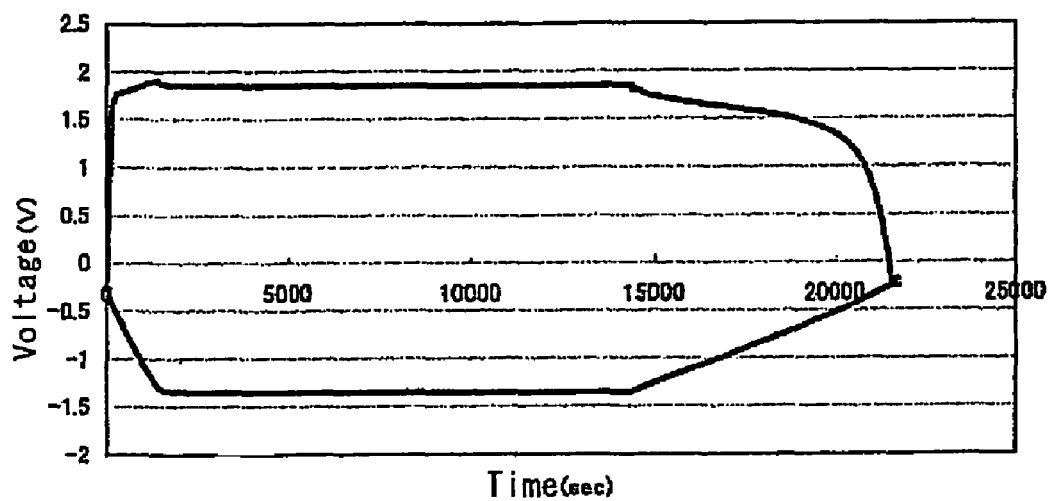
(B)
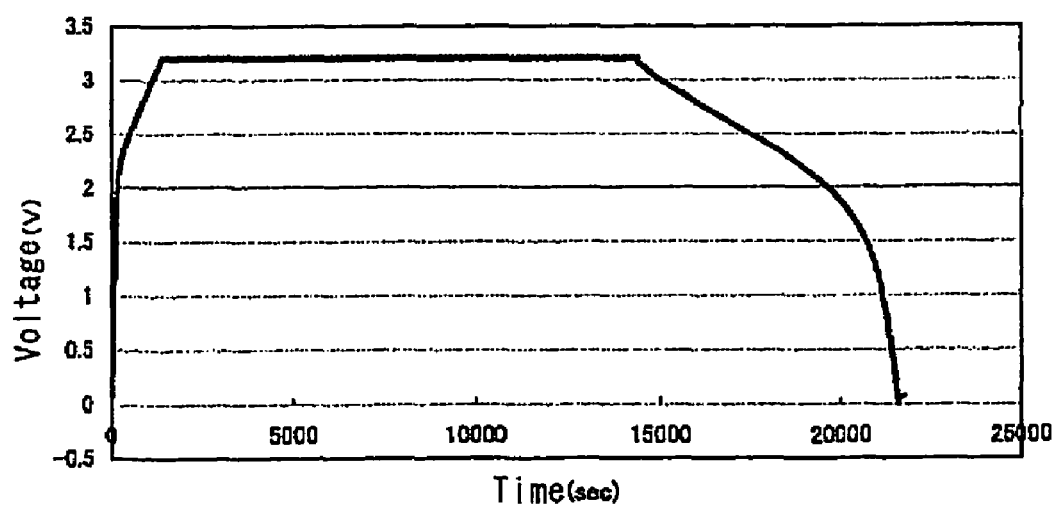

[Fig. 5]
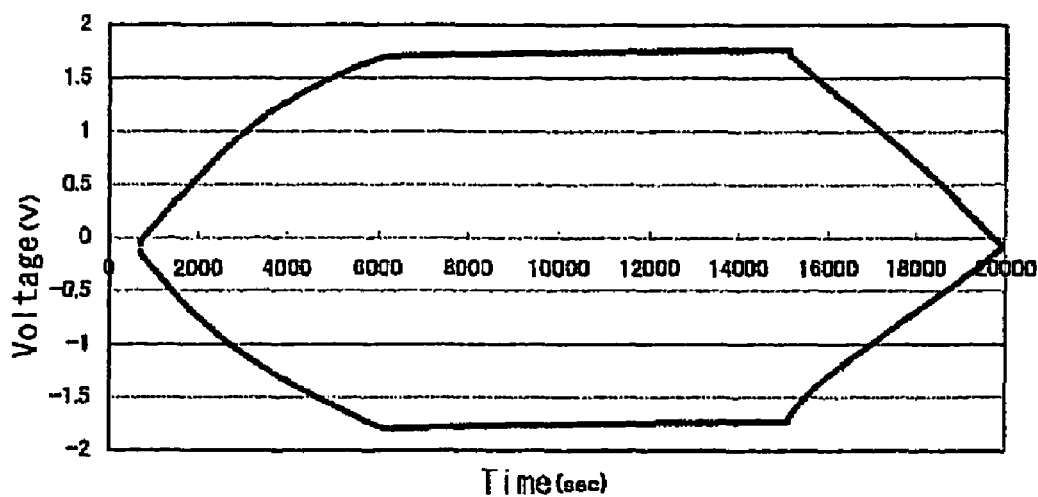
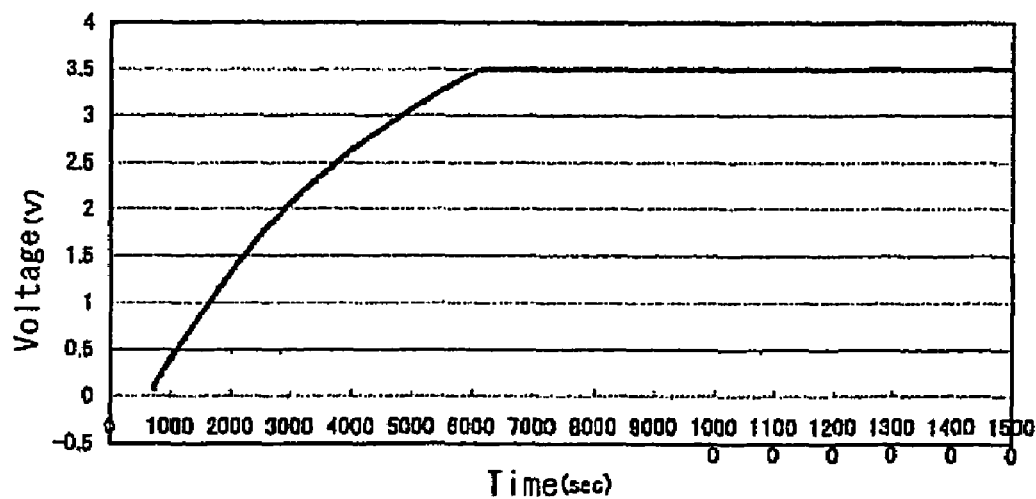

[Fig. 6]
(A)
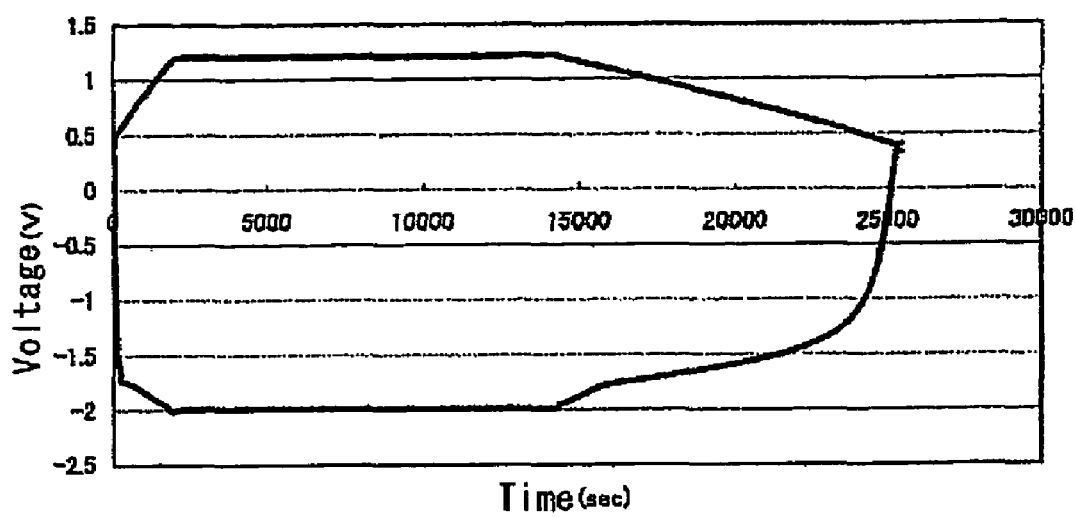
(B)
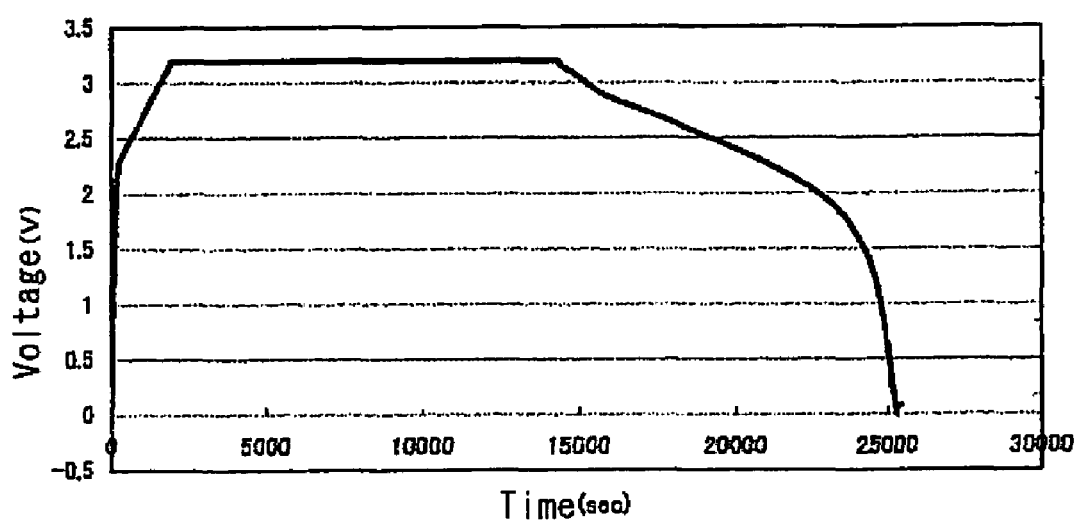

[Fig. 7]
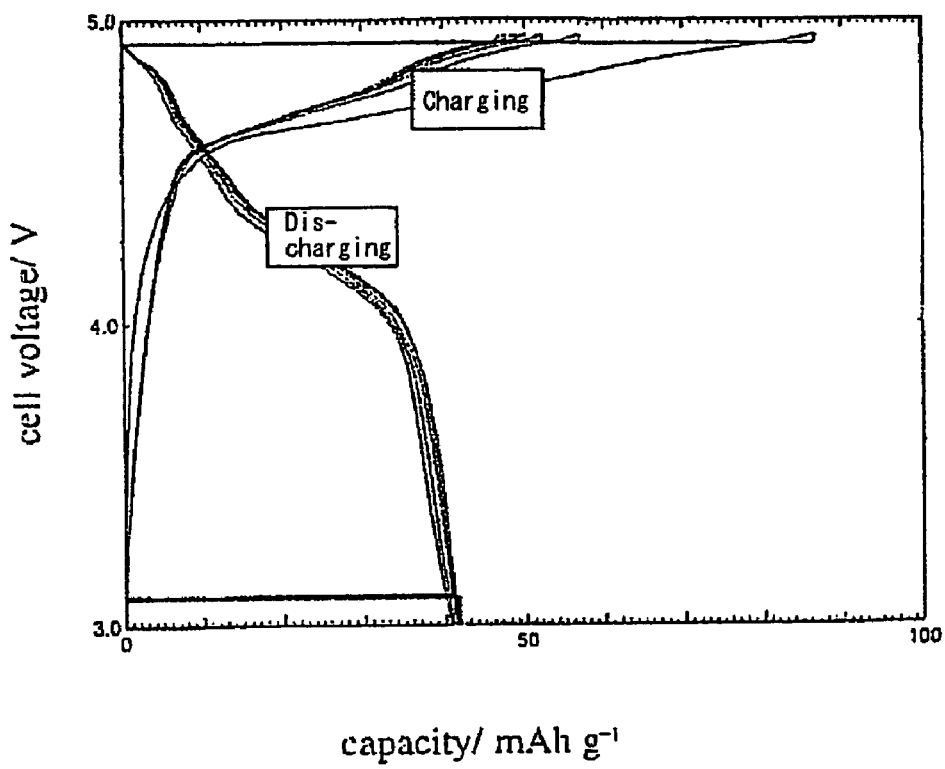
[Fig. 8]
(A)  (B)
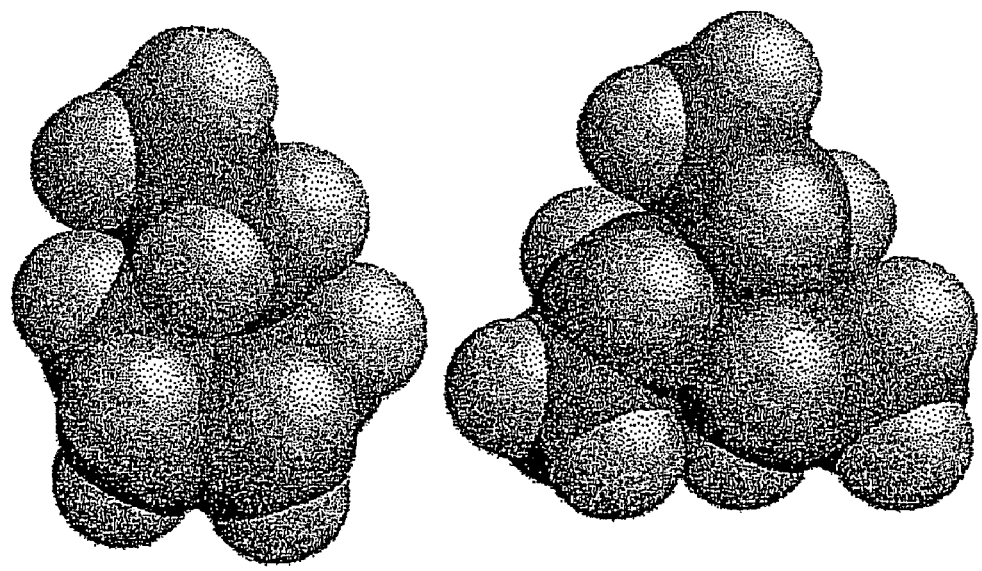

[Fig. 9]
(A) 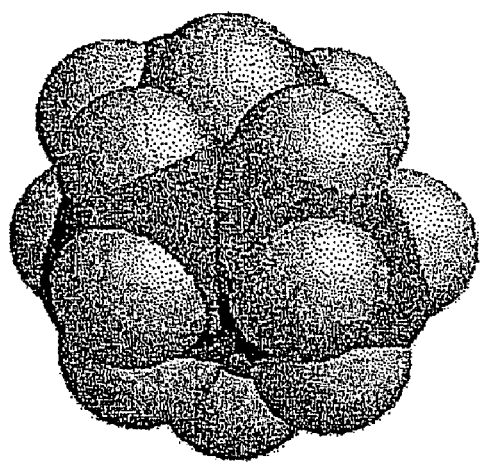
(B) 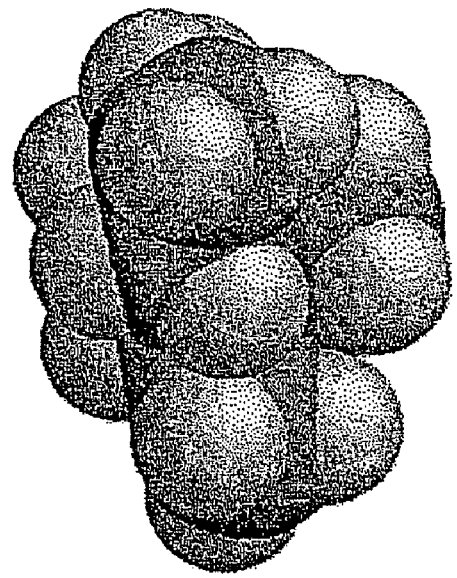

[Fig. 10]
(A)
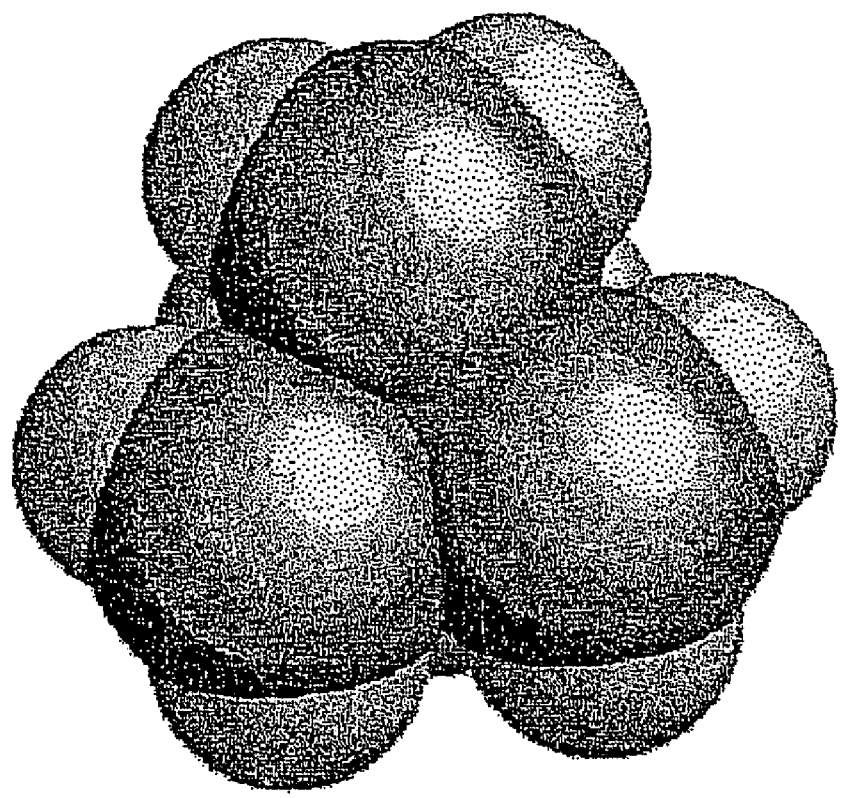
(B)
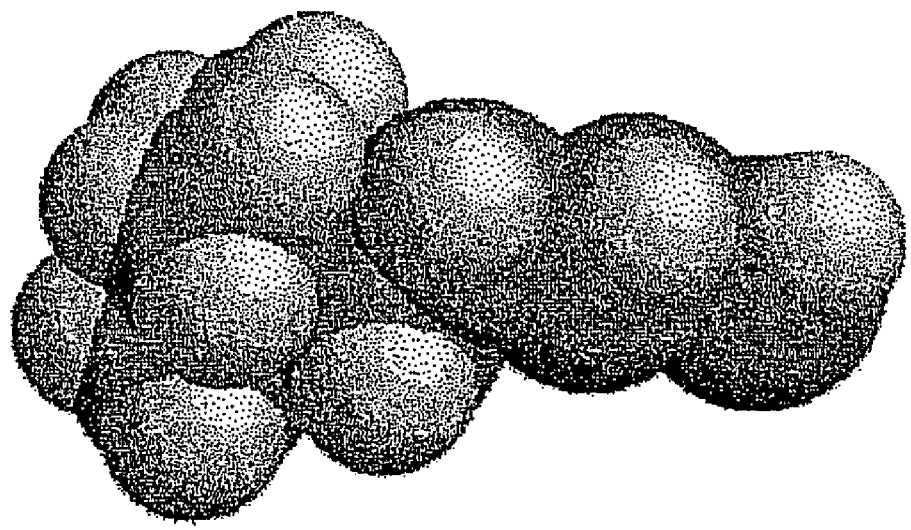

[Fig. 11]
(A)
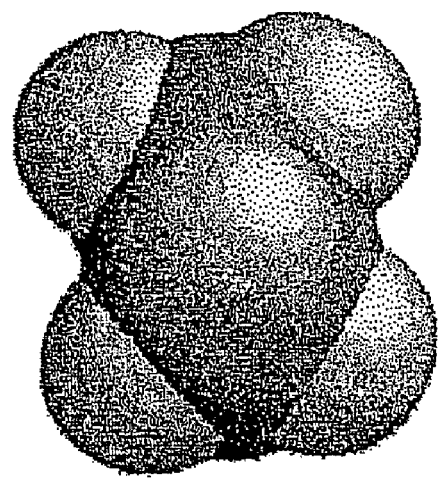
(B)
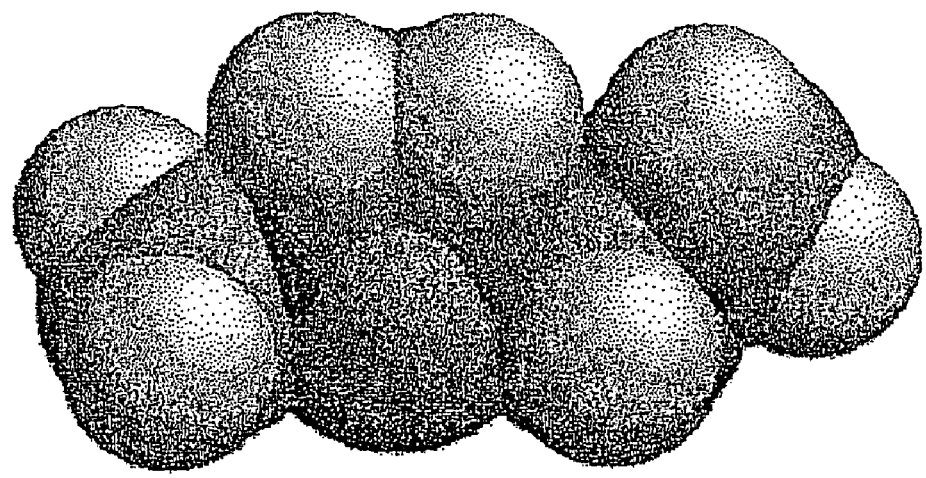

[Fig. 12]
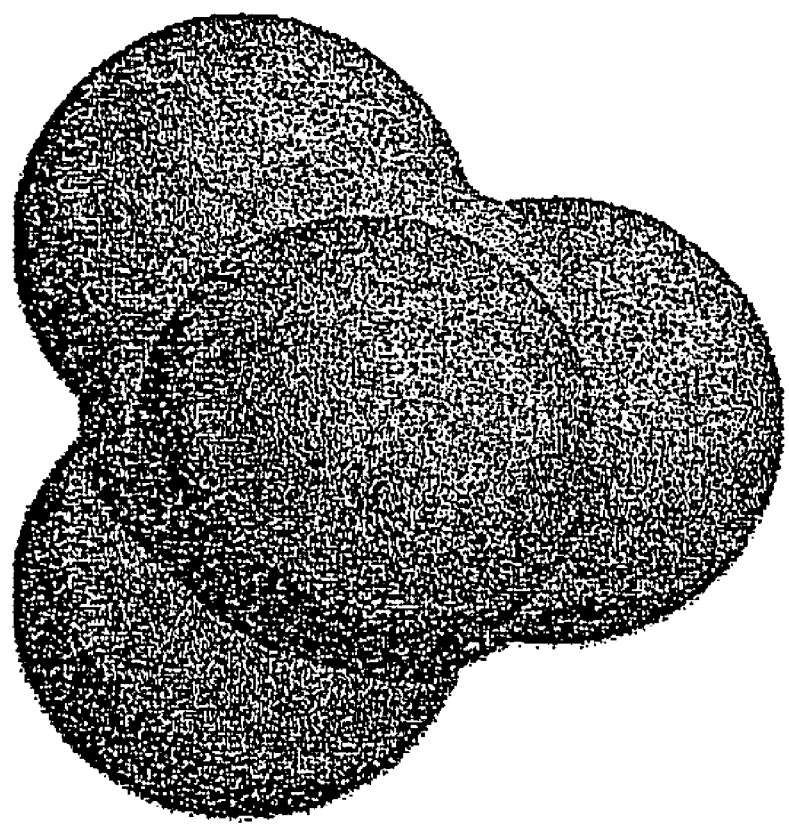

POWER STORAGE ELEMENT AND ELECTRIC DOUBLE LAYER CAPACITOR

TECHNICAL FIELD

The present invention relates to power storage elements, and particularly to electric double layer capacitors. In particular, the invention relates to electric double layer capacitors with a large electrostatic capacitance.

BACKGROUND OF THE INVENTION

In power storage elements and electric double layer capacitors, activated carbon with a large specific surface area has been used as polarizable electrodes. In use of an aqueous solution as an electrolytic solution, there was a problem that the usable withstand voltage is at most about 1 V, which is the electrolysis voltage of water. When using an organic electrolytic solution as an electrolytic solution, it is possible to use a withstand voltage of 3 V or more depending on the kind of the organic electrolytic solution employed. In such cases, therefore, it becomes possible to increase the electrostatic energy, which is proportional to the square of voltage, with increase in withstand voltage.

Moreover, an electric double layer capacitor with an electrostatic capacitance greater than those of electric double layer capacitors using conventional activated carbon has been proposed to be provided by using, as a carbon material for constituting a polarizable electrode, a carbon material being produced by performing a heat treatment together with at least one of an alkali metal and an alkali metal compound, the heat treatment being conducted at a temperature which is not less than a temperature at which a vapor of the alkali metal is generated; and developing an electrostatic capacitance through application of a voltage of not less than a rated voltage firstly between the polarizable electrodes after assembling the electric double layer capacitor so that ions of a solute of the organic electrolytic solution are inserted into a space between microcrystalline carbon layers composed of the carbon material (see, for example, Patent Document 1). Patent Document 1: Japanese Patent Laid-Open Publication No. 2000-77273

DISCLOSURE OF THE INVENTION

Problems to be Solved by the Invention

A problem of the present invention is to provide an electric double layer capacitor which has an electrostatic capacitance per unit volume larger than that of conventional electric double layer capacitors and which has a high withstand voltage and a large electrostatic energy per unit volume.

MEANS FOR SOLVING THE PROBLEMS

The problems of the present invention can be solved by an electric double layer capacitor comprising carbonaceous electrodes immersed in an electrolytic solution, wherein at least one electrode comprises graphite of which changing rate in voltage turns smaller than a voltage changing curve based on a time constant through intake of ions in the electrolytic solution into the graphite in the course of charging at the time of charging with a constant current, and wherein charging/discharging is performed through adsorption and desorption of the ions.

Further, provided is the aforementioned electric double layer capacitor using graphite in both the positive electrode and the negative electrode.

Further, provided is the aforementioned electric double layer capacitor wherein one electrode is composed of a carbon electrode comprising graphite-like microcrystalline carbon of which electrostatic capacitance has been developed through insertion of ions at a first charging, and the carbon therefore showing a voltage changing curve based on a time constant at a second and subsequent charging with a constant current.

Further, provided is the aforementioned electric double layer capacitor wherein the graphite electrode has a volume smaller than that of the counter carbon electrode.

Provided is the aforementioned electric double layer capacitor, wherein at least one electrode comprises a mixture of graphite of which changing rate in voltage turns smaller than a voltage changing curve based on a time constant through intake of ions in the electrolytic solution into the graphite in the course of charging at the time of charging with a constant current, and graphite-like microcrystalline carbon of which electrostatic capacitance has been developed through insertion of ions at a first charging, and the carbon therefore showing a voltage changing curve based on a time constant at a second and subsequent charging with a constant current.

Provided is the aforementioned electric double layer capacitor, wherein the electrolytic solution comprises an ion of which maximum interatomic distance on a minimum projection plane of a molecule is 0.7 nm or less.

Provided is the aforementioned electric double layer capacitor, wherein the electrolytic solution uses an electrolytic solution prepared by dissolving at least one species selected from tetrafluoroborate or hexafluorophosphate of an quaternary ammonium and its derivatives in aprotic solvents.

Provided is the aforementioned electric double layer capacitor, wherein the quaternary ammonium is at least one species selected from the group consisting of pyrrolidinium compounds represented by formula

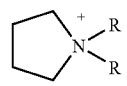

[Chem 1]

wherein R is each independently an alkyl group having from 1 to 10 carbon atoms or R and R form together an alkylene group having 3 to 8 carbon atoms; and spiro-(1,1') bipyrrolidinium, dimethylpyrrolidinium, diethylpyrrolidinium, ethylmethylpyrrolidinium, spiro-bipyridinium, tetramethylphosphonium, tetraethylphosphonium, trimethylalkylammonium in which the alkyl groups have from 2 to 10 carbon atoms.

Provided is the aforementioned electric double layer capacitor, wherein the quaternary ammonium is piperidine-1-spiro-1'-pyrrolidinium.

Provided is the aforementioned electric double layer capacitor, wherein the electrolytic solution comprises 1.5 M/L or more of a solute selected from the group consisting of spiro-(1,1')bipyrrolidinium tetrafluoroborate, spiro-(1,1')bipyrrolidinium hexafluorophosphate, piperidine-1-spiro-1'-pyrrolidinium tetrafluoroborate and piperidine-1-spiro-1'-pyrrolidinium hexafluorophosphate, and a mixed solvent of at least two species selected from the group consisting of propylene carbonate (PC), ethylene carbonate (EC) and diethyl carbonate (DEC).

Provided is the aforementioned electric double layer capacitor, wherein the graphite has an I(1360)/I(1580) peak ratio determined by Raman spectroscopy within the range of from 0.05 to 0.25.

Provided is the aforementioned electric double layer capacitor, wherein the graphite has a hexagonal crystal-to-rhombohedral crystal ratio (Ib/Ia ratio) determined by X-ray diffractometry of 0.3 or more.

Provided is the aforementioned electric double layer capacitor which works in a potential range of from +0.5 V to +6 V based on the oxidation-reduction potential of lithium.

EFFECT OF THE INVENTION

Because the use of graphite which shows specific properties at the time of charging, electric double layer capacitors of the present invention have a large electrostatic capacitance per unit volume and a high withstand voltage and, therefore, can store a large amount of electrostatic energy; thus, it is possible to provide electric double layer capacitors useful for electric power sources for transportation vehicles such as electric cars, electric power storage systems for the electric power industry, etc.

BRIEF DESCRIPTION OF THE DRAWINGS

FIG. 1 is a diagram which demonstrates charging/discharging curves of an electric double layer capacitor of the present invention and a related art electric double layer capacitor.

FIG. 2 is a diagram which illustrate a test cell.

FIG. 3 is a diagram which demonstrates a charging/discharging behavior of a test cell using a graphite of the present invention in a positive electrode.

FIG. 4 is a diagram which illustrates a charging/discharging behavior of another test cell using graphite of the present invention in a positive electrode.

FIG. 5 is a diagram which illustrates a charging/discharging behavior of another test cell using graphite of the present invention in a negative electrode.

FIG. 6 is a diagram which illustrates a charging/discharging behavior of another test cell using a carbon electrode of a comparative example.

FIG. 7 is a charging/discharging curve of a graphite electrode of the present invention to counter lithium metal.

FIG. 8 is diagrams which illustrates minimum projection planes which provides the minimum areas of molecular models of spiro-(1,1')bipyrrolidinium and triethylmethylammonium projected perpendicularly to the sheet plane.

FIG. 9 is diagrams which demonstrates maximum projection planes which provides the maximum areas of molecular models of spiro-(1,1')bipyrrolidinium and triethylmethylammonium projected perpendicularly to the sheet plane.

FIG. 10 is a diagram which illustrates a molecular model of trimethylhexylammonium.

FIG. 11 is a diagram which illustrates a molecular model of ethylmethylimidazolium.

FIG. 12 is a diagram which illustrates a molecular model of a $BF_4$ anion.

EXPLANATION OF REFERENCE NUMERALS

1—Test cell
2—Cell body
3—Bottom cover
4—Top cover
5—O-ring
6—Support member
7—Insulating washer
8—Reference electrode
9—Press plate
10—Support guide
11—Positive electrode current collector
12—Positive electrode
13—Separator
14—Negative electrode
15—Negative electrode current collector
16—Spring

PREFERRED EMBODIMENTS FOR CARRYING OUT THE INVENTION

It was found that use of graphite produced via a graphitization process comprising calcining a carbon material at high temperature, such graphite having conventionally not been used as polarizable electrodes of electric double layer capacitors, makes it possible to provide electric double layer capacitors of the present invention which have electrostatic capacitances larger than those of electric double layer capacitors using conventional activated carbon or carbon materials resulting from activation treatment of nonporous carbon materials.

FIG. 1 shows charging/discharging curves of an electric double layer capacitor of the present invention and an electric double layer capacitor of a prior art example. In FIG. 1(A), which shows a charging/discharging curve of an electric double layer capacitor of the present invention, is characterized in that when charging is conducted with a constant current at the first charging, the voltage change with respect to time, the changing rate in voltage is larger than the voltage changing rate based on a time constant in an initial stage of the charging, and there is an inflection point C1 where the changing rate turns smaller than the voltage changing rate based on a time constant due to the increase in voltage, and there is an inflection point C2 where a similar behavior is shown in the second and subsequent charging.

On the other hand, also in the case of use of a carbon electrode of which electrostatic capacitance has been developed through insertion of solute ions in an organic electrolytic solution between microcrystalline carbon layers by initially applying a voltage equal to or higher than the rated voltage between polarizable electrodes after assembling an electric double layer capacitor using a carbon material having graphite-like microcrystalline carbon disclosed in Patent Document 1, the initial voltage increasing rate is greater than the voltage changing rate based on a time constant, and an inflection point D1 is shown in the course of the first charging as shown in FIG. 1(B). However, there is a difference in that a charging curve based on a time constant is shown at the time of the second charging.

The phenomenon found in a voltage changing curve at the first charging is considered to be an electric current caused by the driving force for permeation of the electrolytic solution into minute pores in the electric double layer capacitor and insertion of ions to carbon. No inflection point is found in the voltage changing curves in the course of the second and subsequent charging with a constant current.

In the phenomenon found in the graphite electrode of the present invention, adsorption of ions from an electrolytic solution to graphite is started at a certain constant voltage in the course of every charging time, and this is expected to develop a large electrostatic capacitance. Further, it is expected that this reaction advances most greatly at the time of first charging since a driving force for permeation of an electrolytic solution into minute pores also works. A similar phenomenon is found also in the course of the second and subsequent charging although the time is shorter than that at the first charging.

Graphite electrodes of the present invention have a larger electrostatic capacitance compared with electrodes made of activated carbon or carbon having micropores formed by initial charging. Therefore, when an electrode of activated carbon or the like is used as a counter electrode, in order to obtain an electrostatic capacitance corresponding to such an electrode of activated carbon or the like, graphite electrodes may have a greatly reduced thickness in comparison to electrodes of activated carbon or the like.

As a result, by reducing the thickness of a graphite electrode, it is possible to provide an electric double layer capacitor having a charging/discharging speed similar to conventional electric double layer capacitors and having a volume smaller than that of conventional products.

Inspection by Raman spectroscopy of graphite which can be applied to the present invention showed that graphite applicable to the present invention is graphite in which there is disorder in graphite layers. Specifically, the disorder in graphite layers was quantified by measuring the ratio of a peak at 1360 cm$^{-1}$ to a peak at 1580 cm$^{-1}$ by Raman spectroscopy. The ratio of I(1360)/I(1580) is between 0.02 and 0.3, and preferably near 0.15.

If the ratio is less than 0.02 or more than 0.3, it is impossible to obtain a sufficient electrostatic capacitance.

In the measurement by X-ray diffractometry, one having a ratio of hexagonal crystals to rhombohedral crystals, namely, a hexagonal crystal/rhombohedral crystal ratio (Ib/Ia) of 0.3 or more is the most preferred.

Use of one having a ratio less than 0.3 will result in a failure in obtaining a sufficient electrostatic capacitance.

It should be noted that use of such graphite especially including rhombohedral crystal components only in a small amount as a negative electrode material of a lithium-ion battery has already been proposed. Carbon material which is a negative electrode material for lithium-ion batteries is the one which developes characteristic as a negative electrode of a battery through insertion of lithium into the carbon material at a potential of +0.25 V or less based on the lithium oxidation-reduction potential. On the other hand, in the electric double layer capacitors of the present invention, the operation potential of a graphite electrode is within a potential range of from +0.5 V to +6 V, preferably from +0.5 V to +5.5V, and more preferably from +0.5 V to 5.0 V based on the lithium oxidation-reduction potential, and it is thought that the electrode works differently in a different region from the carbon material which is a negative electrode material for lithium-ion batteries.

In the graphite electrodes of the present invention, it is expected that a special electric double layer formation occurs at a potential of from −2.5 V to +3 V, preferably from −2.5 V to +2.5 V, and more preferably from −2.5 V to +2.0 V on the basis of a hydrogen reference electrode. As a result, an electrostatic capacitance is expected to be developed. As described above, lithium-ion batteries using intercalation of lithium between graphite layers occurring in a potential region more base than −3 V, which is more base than the potential region of electric double layer capacitors of the present invention, are expected to be different from the electric double layer capacitors of the present invention not only in operation potential region but also in reaction mechanism and the like.

Moreover, desirable features of the present invention are particle diameter: 1 μm to 20 μm, interlayer spacing: 0.3354 to 0.3390 nm, and Lc: 50 to 100 nm.

When a carbon material other than graphite is used as one electrode, examples thereof include carbon materials having graphite-like microcrystalline carbon prepared by heat-treating a raw material such as petroleum-based carbon materials, e.g., petroleum pitch and petroleum coke, carboniferous carbon materials, e.g., coal pitch and coal coke, wood-based carbon materials, e.g., coconut shell and sawdust, resin-based carbon materials, e.g., phenol resin, polyvinyl chloride, polyvinylidene chloride and polyimide, with at least one species selected from alkali metal and/or alkali metal compounds at a temperature not lower than the temperature at which vapor of alkali metal is formed. A resulting electrode is activated by the application of electric current at the time of initial charging, thereby developing an electrostatic capacitance as an electric double layer capacitor. Further, activated carbon having a surface area of from 1000 m$^2$/g to 3000 m$^2$/g may be used.

As an electrolytic solution which can be used in the present invention, one prepared by dissolving a solute in a nonaqueous solvent may be used. In particular, one containing an ion of which maximum interatomic distance on a minimum projection plane of a molecule is 0.7 nm or less is preferable as the electrolytic solution because it is inserted into a carbon material to make an electric double layer capacitor have a large capacitance.

Namely, examples of the anion which works in an electrolytic solution include at least one species selected from the group consisting of tetrafluoroborate ion ($BF_4.$), hexafluorophosphate ion ($PF_6.$), perchlorate ion ($ClO_4.$), hexafluoroarsenate ($AsF_6.$), hexafluoroantimonate ($SbF_6.$), perfluoromethylsulfonyl ($CF_3SO_2.$) and perfluoromethylsulfonate ($CF_3SO_3.$).

The cation is selected from the group consisting of symmetric or ansymmetric quaternary ammonium ions, ions of imidazolium derivatives such as ethylmethylimidazolium and spiro-(1,1')bipyrollidinium and lithium ion. Particular examples include at least one species selected from the group consisting of triethylmethylammonium ion, the above-mentioned pyrrolidinium compounds, spiro-(1,1')bipyrrolidinium, dimethylpyrrolidinium, diethylpyrrolidinium, ethylmethylpyrrolidinium, spiro-bipyridinium, tetramethylphosphonium, tetraethylphosphonium and trimethylalkylammonium in which the alkyl groups have from 2 to 10 carbon atoms. These molecules have a small minimum projection area and develop a large capacitance when being inserted between layers of a carbon material.

As a nonaqueous solvent, at least one species selected from the group consisting of tetrahydrofuran (THF), methyltetrahydrofuran (MeTHF), methylformamide, methyl acetate, diethyl carbonate, dimethyl ether (DME), propylene carbonate (PC), γ-butyrolactone (GBL), dimethyl carbonate (DMC), ethylene carbonate (EC), acetonitrile (AN), sulfolane (SL), or such nonaqueous solvents having halogen in part of their molecules may be selected.

Since it is assumed that special electric double layer formation occurs at about 1.5 V in the positive electrode side or at about −1.6 V in the negative electrode side on the basis of the hydrogen standard potential, both a solvent and a solute need to have a potential window of from −1.6 V to +1.5 V or more. Preferred anions are therefore tetrafluoroborate ion ($BF_4.$), hexafluorophosphate ion ($PF_6.$) and perchlorate ion ($ClO_4.$).

Preferred cations are pyrrolidinium ions such as the aforementioned pyrrolidinium compounds, spiro-(1,1')bipyrrolidinium, piperidine-1-spiro-1'-pyrrolidinium, dimethylpyrrolidinium, diethylpyrrolidinium, ethylmethylpyrrolidinium and spiro-bipyridinium, and tetramethylphosphonium and tetraethylphosphonium. Preferred solvents are at least one species selected from acetonitrile (AN), propylene carbonate (PC), ethylene carbonate (EC), dimethyl carbonate (DMC) and diethyl carbonate (DEC), which have a potential window about from −3 V to +3.5 V.

The electrolytic solution may contain an additive which decomposes within a range of from +1 V to +5 V on the basis of the oxidation-reduction potential of lithium and which forms an ion-permeable film on the surface of a graphite electrode.

At the first application of voltage, charging may be conducted in a temperature atmosphere of from 30° C. to 100° C.

The present invention is described below with reference to examples and comparative examples.

EXAMPLES (Preparation of Graphite Electrode 1)

Three grams of graphite having a Raman ratio of 0.11, a rhombohedral crystal ratio of 0.56, a number-average particle diameter of 3.5 μm, an interlayer spacing of 0.3355 nm, an Lc of 80 nm and contents of elements other than carbon: 72 ppm of Fe, 62 ppm of Si, 32 ppm of Ca, 23 ppm of S and 2 ppm of Al, like graphite 1 given in Table 1, 1 g of acetylene black (manufactured by DENKI KAGAKU KOGYO KABUSHIKI KAISHA) and 0.3 g of polytetrafluoroethylene powder (manufactured by Mitsui DuPont Fluorochemical Co., Ltd.) were mixed and kneaded in an agate mortar, followed by shaping into a sheet uniform in thickness of 0.2 mm using a molding machine. Thus, graphite electrode 1 was produced. The density was 0.8 g/cc.

(Preparation of Graphite Electrode 2)

Graphite electrode 2 was produced in the same manner as that of the preparation of graphite electrode 1 except for using graphite having a Raman ratio of 0.05, a rhombohedral crystal ratio of 0, an average particle diameter of 3.0 μm, an interlayer spacing of 0.354 nm and a specific surface area of 13 $m^2/g$, like Graphite 2 given in Table 1, in place of the graphite used in the preparation 1 of graphite electrode.

(Preparation of Graphite Electrode 3)

Graphite electrode 3 was produced in the same manner as that of the preparation of graphite electrodes except for using graphite having a Raman ratio of 0.06, a rhombohedral crystal ratio of 0.53, an average particle diameter of 3.0 μm, an interlayer spacing of 0.354 nm and a specific surface area of 5 $m^2/g$, like Graphite 3 given in Table 1, in place of the graphite used in the preparation 1 of graphite electrode.

(Preparation of Graphite Electrode 4)

Graphite electrode 4 was produced in the same manner as that of the preparation of graphite electrode 1 except for using graphite having a Raman ratio of 0.05, a rhombohedral crystal ratio of 0, an average particle diameter of 3.0 μm, an interlayer spacing of 0.354 nm and a specific surface area of 15 $m^2/g$, like Graphite 4 given in Table 1, in place of the graphite used in the preparation 1 of graphite electrode.

(Preparation of Graphite Electrode 5)

Graphite electrode 5 was produced in the same manner as that of the preparation of graphite electrode 1 except for using a graphite having a Raman ratio of 0.05, a rhombohedral crystal ratio of 0, an average particle diameter of 2.5 μm, an interlayer spacing of 0.355 nm and a specific surface area of 5 $m^2/g$, like Graphite 5 given in Table 1, in place of the graphite used in the preparation 1 of graphite electrode.

(Preparation of Graphite Electrode 6)

Graphite electrode was produced in the same manner as that of the preparation of graphite electrode 1 except for using graphite having a Raman ratio of 0.19, a rhombohedral crystal ratio of 0.33, an average particle diameter of 0.5 μm and a specific surface area of 300 $m^2/g$, like Graphite 6 given in Table 1, in place of the graphite used in the preparation 1 of graphite electrode.

(Preparation of Graphite Electrode 7)

Graphite electrode 7 was produced in the same manner as that of the preparation of graphite electrode 1 except for using carbon having a Raman ratio of 0.16, a rhombohedral crystal ratio of 0, an average particle diameter of 5 μm and a specific surface area of 15 $m^2/g$, like Graphite 7 given in Table 1, which was prepared by calcining mesophase carbon MCMB at 2800° C. for 15 hours, in place of the graphite used in the preparation 1 of graphite electrode.

(Preparation of Graphite Electrode 8)

Graphite electrode 8 was produced in the same manner as that of the preparation of graphite electrode 1 except for using graphite having a Raman ratio of 0.26, a rhombohedral crystal ratio of 0.31, an average particle diameter of 3 μm and a specific surface area of 80 $m^2/g$, like Graphite 8 given in Table 1, in place of the graphite used in the preparation 1 of graphite electrode.

(Preparation of Graphite Electrode 9)

Graphite electrode 8 was produced in the same manner as that of the preparation of graphite electrode 1 except for using graphite having a Raman ratio of 0.03, a rhombohedral crystal ratio of 0.19, an average particle diameter of 5 μm and a specific surface area of 12 $m^2/g$, like Graphite 9 given in Table 1, in place of the graphite used in the preparation 1 of graphite electrode.

(Result of Charging/Discharging Using a Metal Lithium Counter Electrode)

When charging/discharging was conducted with a constant current of 0.5 mA using lithium metal as a negative electrode, Graphite 1 given in Table 1 as a positive electrode and a 0.8 M solution of LiPF6 in EC/DMC as an electrolytic solution, a charging/discharging curve as shown in FIG. 7 was obtained. Graphite 1 came to develop a capacitance rapidly near 4.5 V on the basis of the counter lithium metal and an electric capacitance of about 25 mAh/g was obtained near 4.8 V. That is, graphite with a BET surface area of from 5 to 300 $m^2/g$ having an electric energy storing ability of from 10 to 200 mAh at a voltage of 1 V or more on the basis of the oxidation-reduction potential of metal lithium, and a power storage element using this graphite were found. Preferably, the above-mentioned graphite has an electric energy storing ability of from 10 to 150 mAh at a voltage of from 3 to 6 V on the basis of the oxidation-reduction potential of metal lithium, and a BET surface area of from 10 to 250 $m^2/g$.

(Analysis Results of Graphite)

The graphites used in a graphite electrode were measured by using a Raman spectroscopic apparatus (manufactured by JOBIN YVON, S.A.S., spectrometer: 500 M, detector: Specrum ONE, software: Spectra MAX), mounting a microscopic unit (manufactured by Seishin Trading Co., Ltd.)

equipped with a microscope (manufactured by Olympus Corporation, BX60M), and using a laser irradiation apparatus (NEC Corporation Ar-Laser GLG3280). In particular, peaks near 1580 and 1360 cm$^{-1}$ were measured and a half width of a graphite-derived peak at 1580 cm$^{-1}$ was determined in the unit of cm$^{-1}$.

The graphites were measured using an X-ray diffraction apparatus (manufactured by Rigaku Corporation, RINT2000).

When the half width of a hexagonal crystal (002) peak near 2θ=26.5° is within 1°, the crystallinity was judged as good.

The crystallization degree was calculated from the formula: crystallization degree=(3.44−d(002))/0.0868. Regarding d(002), an interplanar spacing d(002) was determined from the peak position near 2θ=26.5°.

The peak position of a rhombohedral crystal (101) was near 2θ=43.3° and the peak intensity thereof is indicated by IB.

The peak position of a hexagonal crystal (100) was near 2θ=42.4° and the peak intensity is indicated by IA. The peak intensity ratio IB/IA was defined as a intensity ratio.

A hexagonal crystal (101) is at around 2θ=44.5°. When the vicinity of 2θ=43.30°, which corresponds the peak of a rhombohedral crystal (101), was flat or concave, it was judged that there was no rhombohedral crystal, whereas the case where a slight peak was found was defined as a trace.

Regarding the specific surface area, a BET specific surface area was determined by using a specific surface area analyzer ("Gemini2375" manufactured by Shimadzu Corporation). The average particle diameter was measured by means of a particle size distribution analyzer (a centrifugal automatic particle size distribution analyzer CAPA-300 manufactured by HORIBA, Ltd.).

The results mentioned above are shown in Table 1.

(Preparation of Polarizable Carbon Electrode 1)

Three grams of activated carbon MSP-20, manufactured by THE KANSAI COKE AND CHEMICALS CO., LTD.), 1 g of acetylene black (manufactured by DENKI KAGAKU KOGYO K. K.) and 0.3 g of polytetrafluoroethylene powder (manufactured by Mitsui duPont Fluorochemical Co., Ltd.) were mixed and kneaded in an agate mortar, followed by shaping into a sheet form having a uniform thickness of 0.2 mm. Thus, polarizable carbon electrode 1 was obtained. The density was 0.8 g/cc. This is indicated as activated carbon 1 in tables.

(Preparation of Polarizable Carbon Electrode 2)

Polarizable carbon electrode 2 was obtained in the same manner as activated carbon electrode 1 except for setting the thickness of the electrode to 0.8 mm. It is indicated as activated carbon 2 in tables.

(Preparation of Polarizable Carbon Electrode 3)

Polarizable carbon electrode 3 was obtained in the same manner as activated carbon electrode 1 except for setting the thickness of the electrode to 1.0 mm. It is indicated as activated carbon 3 in tables.

(Preparation of Polarizable Carbon Electrode 4)

Polarizable carbon electrode 4 was obtained in the same manner as activated carbon electrode 1 except for setting the thickness of the electrode to 1.2 mm. This is indicated as activated carbon 4 in tables.

(Preparation of Nonporous Carbon Electrode 1)

Needle coke (manufactured by Nippon Steel Chemical Co., Ltd.) was calcined under nitrogen flow at 1000° C. for 5 hours. Next, it was mixed with potassium hydroxide in an amount three times its amount and then calcined similarly under nitrogen flow at 750° C. for 5 hours to be activated.

The resultant washed and then the surface area thereof was measured using a nitrogen adsorption isotherm by the BET method to be 80 m$^2$/g. This was a nonporous carbon having a surface area as wide as about 1/20 that of normal activated carbon.

Three grams of the resulting nonporous carbon, 1 g of acetylene black (manufactured by DENKI KAGAKU KOGYO K. K.) and 0.3 g of polytetrafluoroethylene powder (manufactured by Mitsui duPont Fluorochemical Co., Ltd.) were mixed and kneaded in an agate mortar and then shaped into a sheet form having a uniform thickness of 0.2 mm. Thus, nonporous carbon electrode 1 was obtained. The density was 0.8 g/cc. It is indicated as nonporous 1 in tables.

(Preparation of Nonporous Carbon Electrode 2)

Nonporous carbon electrode 2 was obtained in the same manner as nonporous carbon electrode 1 except for setting the thickness of the electrode to 0.8 mm. It is indicated as nonporous 2 in tables.

TABLE 1

| | Result of Raman measurement | | | Result of X-ray diffraction | | | | Average particle diameter (μm) | Specific surface area (m$^2$/g) |
|---|---|---|---|---|---|---|---|---|---|
| Sample name | Raman ratio | Half width (cm$^{-1}$) | Crystallinity | Hexagonal crystal (100)I$_A$ | Rhombohedral crystal (101)I$_B$ | Intensity ratio IB/IA | Crystallization degree | | |
| Graphite 1 | 0.11 | 25 | Good | Present | Present | 0.56 | 0.899 | 3.5 | 17 |
| Graphite 2 | 0.05 | 17 | Good | Present | Absent | 0 | 0.902 | 3 | 13 |
| Graphite 3 | 0.06 | 20 | Good | Present | Present | 0.53 | 0.985 | 3 | 16 |
| Graphite 4 | 0.05 | 19 | Good | Present | Absent | 0 | 0.899 | 10 | 16 |
| Graphite 5 | 0.05 | 18 | Good | Present | Present | 0 | 0.942 | 2.5 | 20 |
| Graphite 6 | 0.19 | 24 | Good | Present | Present | 0.33 | 0.890 | 0.5 | 270 |
| Graphite 7 | 0.16 | 25 | Good | Present | Trace | 0 | 0.842 | 5.5 | 15 |
| Graphite 8 | 0.26 | 23 | Good | Present | Present | 0.31 | 0.903 | 3.0 | 80 |
| Graphite 9 | 0.03 | 15 | Good | Present | Present | 0.19 | 0.899 | 5 | 12 |

In the table, the Raman ratio indicates an intensity ratio of 1360 cm$^{-1}$ to 1580 cm$^{-1}$, I(1360)/I(1580).

(Preparation of Nonporous Carbon Electrode 3)

Nonporous carbon electrode 3 was obtained in the same manner as nonporous carbon electrode 1 except for setting the thickness of the electrode to 1.0 mm. It is indicated as nonporous 3 in tables.

(Preparation of Nonporous Carbon Electrode 4)

Nonporous carbon electrode 4 was obtained in the same manner as nonporous carbon electrode 1 except for setting the thickness of the electrode to 1.2 mm. It is indicated as nonporous 4 in tables.

(Preparation of Nonporous Carbon Electrode 5)

Nonporous carbon electrode 5 was obtained in the same manner as nonporous carbon electrode 1 except for setting the thickness of the electrode to 0.4 mm. It is indicated as nonporous 5 in tables.

(Preparation of Graphite+Nonporous Electrode)

A mixed electrode of nonporous carbon and graphite (graphite+nonporous electrode) was obtained in the same manner as nonporous electrode 1 except for mixing a nonporous carbon used for the preparation of nonporous carbon electrode 1 and graphite 1 given in Table 1 each in an amount of 1.5 g.

(Preparation of Test Cell)

Each of graphite electrodes 1 to 8, activated carbon electrodes 1 to 4 and nonporous carbon electrodes 1 to 5 prepared previously was cut into a size 20 mm in diameter. A test cell, whose perspective view is shown in FIG. 2, having three electrodes including a reference electrode was assembled via a separator (manufactured by Nippon Kodoshi Corporation, MER3-5) according to a combination shown in Table 2.

In FIG. 2, a test cell 1 includes a cell body 2, a bottom cover 3 and a top cover 4, and is assembled using a support member 6 and an insulating washer 7 integrally via an O-ring 5 made of insulating material.

A reference electrode 8 composed of an activated carbon electrode and the like, is held between cell body 2 and bottom cover 3 with a porous press plate 9 made of metal such as stainless steel and aluminum. Thus, the current is collected.

Between cell body 2 and top cover 4, a positive electrode current collector 11 and a positive electrode 12 are fitted into an opening formed in a support guide 10 made of an insulating material; a negative electrode 14 and a negative electrode current collector 15 are arranged on the positive electrode via a separator 13; an electrolytic solution is poured; and then they are hermetically sealed while being pressed with a spring 16. Each of the constituting members, namely, the cell body, the bottom cover and the top cover, is connected to the positive electrode, the reference electrode and the negative electrode. A charging/discharging test of an electric double layer capacitor in a state where the hermetically-sealed state is held has been made possible.

(Charging/Discharging Test)

A charging current was applied to a resulting test cell with a constant current of 5 mA, and at arrival to 3.2 V, switch to a constant voltage was made. Following the charging for 2 hours in total, discharging was conducted to 5 mA and 2 V and the electrostatic capacitance of the test cell and the electrostatic capacitance per unit volume were measured, which are shown as cell capacitance (unit: F) and volumetric capacitance (unit: F/cm$^3$), respectively, shown in Table 2.

Further, at the time of charging/discharging, the positive electrode potential and negative electrode potential based on the standard hydrogen potential were measured, together with terminal voltages, on the basis of the reference electrode.

TABLE 2

| Cell number | Positive electrode | Negative electrode | Electrolytic solution | Cell capacitance (F) | Volumetric capacitance (F/cm$^3$) |
|---|---|---|---|---|---|
| 1-1 | Graphite 1 | Graphite 1 | SBPBF4/PC | 9.97 | 79.30 |
| 1-2 | Graphite 1 | Graphite 1 | TEMABF4/PC | 0.06 | 0.51 |
| 1-3 | Graphite 1 | Graphite 1 | LiPF6/PC | 0.04 | 0.32 |
| 1-4 | Graphite 1 | Graphite 1 | EMIBF4/PC | 0.03 | 0.21 |
| 1-5 | Graphite 1 | Graphite 1 | DMPBF4/PC | 9.81 | 78.10 |
| 1-6 | Graphite 1 | Graphite 1 | DEPBF4/PC | 9.71 | 77.30 |
| 1-7 | Graphite 1 | Graphite 1 | DEMPBF4/PC | 10.93 | 87.00 |
| 1-8 | Graphite 1 | Graphite 1 | DMP1BF4/PC | 8.83 | 70.30 |
| 1-9 | Graphite 1 | Graphite 1 | DEP1BF4/PC | 8.85 | 70.40 |
| 1-10 | Graphite 1 | Graphite 1 | EMP1BF4/PC | 8.81 | 70.10 |
| 1-11 | Graphite 1 | Graphite 1 | SBPi1BF4/PC | 7.99 | 63.60 |
| 1-12 | Graphite 1 | Graphite 1 | TMPBF4/PC | 8.83 | 70.30 |
| 1-13 | Graphite 1 | Graphite 1 | TEPBF4/PC | 7.21 | 57.40 |
| 1-14 | Graphite 1 | Graphite 1 | TMPABF4/PC | 8.80 | 70.28 |
| 1-15 | Graphite 1 | Graphite 1 | TMOABF4/PC | 8.81 | 70.29 |
| 1-16 | Graphite 1 | Graphite 1 | PliPPBF4/PC | 8.91 | 70.86 |
| 2-1 | Graphite 2 | Graphite 2 | SBPBF4/PC | 0.10 | 0.81 |
| 2-2 | Graphite 3 | Graphite 3 | SBPBF4/PC | 0.11 | 0.88 |
| 2-3 | Graphite 4 | Graphite 4 | SBPBF4/PC | 0.06 | 0.49 |
| 2-4 | Graphite 5 | Graphite 5 | SBPBF4/PC | 0.03 | 0.21 |
| 2-5 | Graphite 6 | Graphite 6 | SBPBF4/PC | 9.80 | 77.99 |
| 2-6 | Graphite 7 | Graphite 7 | SBPBF4/PC | 4.20 | 33.42 |
| 2-7 | Graphite 8 | Graphite 8 | SBPBF4/PC | 6.33 | 50.38 |
| 2-8 | Graphite 9 | Graphite 9 | SBPBF4/PC | 3.29 | 26.18 |
| 3-1 | Graphite 2 | Activated carbon 1 | SBPBF4/PC | 0.06 | 0.49 |
| 3-2 | Graphite 3 | Activated carbon 1 | SBPBF4/PC | 0.10 | 0.79 |
| 3-3 | Graphite 4 | Activated carbon 1 | SBPBF4/PC | 0.15 | 1.21 |

TABLE 2-continued

| Cell number | Positive electrode | Negative electrode | Electrolytic solution | Cell capacitance (F) | Volumetric capacitance (F/cm$^3$) |
|---|---|---|---|---|---|
| 3-4 | Graphite 5 | Activated carbon 1 | SBPBF4/PC | 0.14 | 1.12 |
| 3-5 | Graphite 6 | Activated carbon 1 | SBPBF4/PC | 1.42 | 10.47 |
| 3-6 | Graphite 7 | Activated carbon 1 | SBPBF4/PC | 0.75 | 5.53 |
| 4-1 | Graphite 1 | Activated carbon 1 | TEMAPF6/PC | 1.30 | 10.32 |
| 4-2 | Graphite 1 | Activated carbon 2 | TEMAPF6/PC | 7.95 | 25.29 |
| 4-3 | Graphite 1 | Activated carbon 3 | TEMAPF6/PC | 11.35 | 30.11 |
| 4-4 | Graphite 1 | Activated carbon 4 | TEMAPF6/PC | 12.92 | 29.37 |
| 5-1 | Graphite 1 | Activated carbon 1 | TEMABF4/PC | 1.11 | 8.85 |
| 5-2 | Graphite 1 | Activated carbon 2 | TEMABF4/PC | 7.52 | 23.93 |
| 5-3 | Graphite 1 | Activated carbon 3 | TEMABF4/PC | 10.61 | 28.14 |
| 5-4 | Graphite 1 | Activated carbon 4 | TEMABF4/PC | 11.90 | 27.06 |
| 6-1 | Graphite 1 | Nonporous 1 | TEMABF4/PC | 1.92 | 15.31 |
| 6-2 | Graphite 1 | Nonporous 2 | TEMABF4/PC | 11.65 | 37.07 |
| 6-3 | Graphite 1 | Nonporous 3 | TEMABF4/PC | 14.03 | 37.22 |
| 6-4 | Graphite 1 | Nonporous 4 | TEMABF4/PC | 16.80 | 38.20 |
| 6-5 | Graphite 1 | Nonporous 4 | SBPBF4/PC | 17.2 | 39.11 |
| 6-6 | Graphite 1 | Nonporous 4 | SBPPF6/PC | 18.1 | 41.16 |
| 6-7 | Graphite 1 | Nonporous 4 | PliPPBF4/PC | 17.5 | 39.79 |
| 6-8 | Graphite 1 | Nonporous 4 | PliPPPF6/PC | 18.3 | 41.61 |
| 6-9 | Graphite 1 | Nonporous 4 | SBPBF4/PC:EC | 17.6 | 40.02 |
| 6-10 | Graphite 1 | Nonporous 4 | SBPPP6/PC:EC | 18.6 | 42.29 |
| 6-11 | Graphite 1 | Nonporous 4 | PliPPBF4/PC:EC | 18.1 | 41.16 |
| 6-12 | Graphite 1 | Nonporous 4 | PliPPPF6/PC:EC | 18.9 | 42.98 |
| 7-1 | Graphite 1 | Activated carbon 1 | SBPBF4/PC | 0.98 | 7.82 |
| 7-2 | Graphite 1 | Activated carbon 2 | SBPBF4/PC | 6.96 | 22.14 |
| 7-3 | Graphite 1 | Activated carbon 3 | SBPBF4/PC | 9.85 | 26.13 |
| 7-4 | Graphite 1 | Activated carbon 4 | SBPBF4/PC | 11.41 | 25.94 |
| 7-5 | Graphite 1 | Activated carbon 4 | SBPBF4/PC | 12.3 | 27.97 |
| 7-6 | Graphite 1 | Activated carbon 4 | SBPPF6/PC | 12.6 | 28.65 |
| 7-7 | Graphite 1 | Activated carbon 4 | PliPPBF4/PC | 12.7 | 28.88 |
| 7-8 | Graphite 1 | Activated carbon 4 | PliPPPF6/PC | 13.1 | 29.79 |
| 7-9 | Graphite 1 | Activated carbon 4 | SBPBF4/PC:EC | 13.1 | 29.79 |
| 7-10 | Graphite 1 | Activated carbon 4 | SBPPP6/PC:EC | 13.3 | 30.24 |
| 7-11 | Graphite 1 | Activated carbon 4 | PliPPBF4/PC:EC | 13.4 | 30.47 |
| 7-12 | Graphite 1 | Activated carbon 4 | PliPPPF6/PC:EC | 13.7 | 31.15 |
| 8-1 | Activated carbon 1 | Graphite 1 | SBPBF4/PC | 1.11 | 8.84 |
| 8-2 | Activated carbon 2 | Graphite 1 | SBPBF4/PC | 6.70 | 21.32 |
| 8-3 | Activated carbon 3 | Graphite 1 | SBPBF4/PC | 9.78 | 25.93 |
| 8-4 | Activated carbon 4 | Graphite 1 | SBPBF4/PC | 11.92 | 27.11 |
| 9-1 | Nonporous 1 | Graphite 1 | SPBPF6/PC | 1.70 | 13.51 |
| 9-2 | Nonporous 2 | Graphite 1 | SPBPF6/PC | 9.42 | 30.00 |
| 9-3 | Nonporous 3 | Graphite 1 | SPBPF6/PC | 11.74 | 31.13 |
| 9-4 | Nonporous 4 | Graphite 1 | SPBPF6/PC | 13.25 | 30.12 |
| 10-1 | Nonporous 5 | Nonporous 5 | TEMABF4/PC | 7.30 | 29.06 |
| 11-1 | Graphite + Nonporous | Graphite + Nonporous | SBPBF4/PC | 19.8 | 46.98 |
| 11-2 | Graphite + Nonporous | Graphite + Nonporous | SBPBF6/PC | 21.1 | 50.06 |

TABLE 2-continued

| Cell number | Positive electrode | Negative electrode | Electrolytic solution | Cell capacitance (F) | Volumetric capacitance (F/cm³) |
|---|---|---|---|---|---|
| 11-3 | Graphite + Nonporous | Graphite + Nonporous | PliPPBF4/PC | 20.1 | 47.69 |
| 11-4 | Graphite + Nonporous | Graphite + Nonporous | PliPPPF6/PC | 21.3 | 50.54 |

In Table 2,

TEMABF4/PC: 1.5 M/L solution of triethylmethylammonium tetrafluoroborate in propylene carbonate TEMAPF6/PC: 1.5 M/L solution of triethylmethylammonium hexafluorophosphate in propylene carbonate SBPBF4/PC: 1.5 M/L solution of spiro-(1,1')bipyrrolidinium tetrafluoroborate in propylene carbonate SBPPF6/PC: 1.5 M/L solution of spiro-(1,1')bipyrrolidinium hexafluorophosphate in propylene carbonate DMPBF4/PC: 1.5 M/L solution of dimethylpyrrolidinium tetrafluoroborate in propylene carbonate DEPBF4/PC: 1.5 M/L solution of diethylpyrrolidinium tetrafluoroborate in propylene carbonate DEMPBF4/PC: 1.5 M/L solution of ethylmethylpyrrolidinium tetrafluoroborate in propylene carbonate DMP1BF4/PC: 1.0 M/L solution of dimethylpyrrolidinium tetrafluoroborate in propylene carbonate DEP1BF4/PC: 1.0 M/L solution of diethylpyrrolidinium tetrafluoroborate in propylene carbonate EMP1BF4/PC: 1.0 M/L solution of ethylmethylpyrrolidinium tetrafluoroborate in propylene carbonate SBPi1BF4/PC: 1.0 M/L solution of spiro-bipyridinium tetrafluoroborate in propylene carbonate TMPBF4/PC: 0.8 M/L solution of tetramethylphosphonium tetrafluoroborate in propylene carbonate TEPBF4/PC: 0.8 M/L solution of tetraethylphosphonium tetrafluoroborate in propylene carbonate LiPF6/PC: 0.8 M/L solution of lithium hexafluorophosphate in propylene carbonate EMIBF4/PC: 1.5 M/L solution of ethylmethylimidazolium in propylene carbonate TMPABF4/PC: 0.8 M/L solution of trimethylpentylammonium tetrafluoroborate in propylene carbonate TMOABF4/PC: 0.8 M/L solution of trimethyloctylammonium tetrafluoroborate in propylene carbonate PliPPBF4/PC: 1.5 M/L solution of piperidine-1-spiro-1'-pyrrolidinium $BF_4$ in propylene carbonate PliPPPF6/PC: 1.5 M/L solution of piperidine-1-spiro-1'-pyrrolidinium $PF_6$ in propylene carbonate PliPPBF4/PC:EC: 1.5 M/L solution of piperidine-1-spiro-1'-pyrrolidinium $BF_4$ in propylene carbonate:ethylene carbonate (50:50)

PliPPPF6/PC:EC: 1.5 M/L solution of piperidine-1-spiro-1'-pyrrolidinium $BF_4$ in propylene carbonate:ethylene carbonate (50:50)

SBPBF4/PC:EC: 1.5 M/L solution of spiro-bipyrrolidinium $BF_4$ in propylene carbonate:ethylene carbonate (50:50)

SBPPF6/PC:EC: 1.5 M/L solution of spiro-bipyrrolidinium $PF_6$ in propylene carbonate:ethylene carbonate (50:50)

(Charging/Discharging Curve Behavior No. 1)

FIG. 3 is a diagram which demonstrates a charging/discharging curve in the second charging/discharging for Cell No. 1-1 using a graphite of the present invention in a positive electrode: FIG. 3(A) is a diagram showing measurements of the potentials of the positive electrode and the negative electrode based on a standard hydrogen electrode measured using a reference electrode; and FIG. 3(B) is a diagram showing only the voltage detected at the start of charging in the measurement of terminal voltage.

In the voltage curve, a remarkable inflection point is observed near a terminal voltage of 2.1 V in the charging side, and the slope of voltage to time changes significantly at the inflection point.

FIG. 4 is a diagram which demonstrates a charging/discharging curve in the second charging/discharging for Cell No. 7-2 using a graphite of the present invention in a positive electrode: FIG. 4(A) is a diagram showing measurements of the potentials of the positive electrode and the negative electrode based on a standard hydrogen electrode measured using a reference electrode; and FIG. 4(B) is a diagram showing only the voltage detected at the start of charging in the measurement of terminal voltage.

In the voltage curve, remarkable inflection points are observed in both the charging and discharging sides near a terminal voltage of 2.2 V and the slopes of voltage to time change significantly at the inflection points.

FIG. 5 is a diagram which demonstrates a charging/discharging curve in the second charging/discharging for Cell No. 8-3 using a graphite of the present invention in a negative electrode: FIG. 5(A) is a diagram showing separate measurements of the potentials of the positive electrode and the negative electrode based on a standard hydrogen electrode measured using a reference electrode, and FIG. 5(B) is a diagram showing only the voltage detected at the start of charging in the measurement of terminal voltage.

In the voltage curve, remarkable inflection points are observed in both the charge and discharging sides near a terminal voltage of 2.3 V and the slopes of voltage to time change significantly at the inflection points.

(Behavior of Charging/Discharging Curve 2)

FIG. 6 is a diagram which demonstrates a charging/discharging curve in the second charging/discharging for Cell No. 10-1 which represents a comparative example of a structure similar to that of the electric double layer capacitor disclosed in related art 1.

As both the positive and negative electrodes, used were nonporous carbon electrodes of which electrostatic capacitance is developed at the time of the first charging. FIG. 6(A) is a diagram showing separate measurements of the potentials of the positive electrode and the negative electrode based on a standard hydrogen electrode measured using a reference electrode; and FIG. 6(B) is a diagram enlargingly showing only the voltage detected at the start of charging in the measurement of terminal voltage.

In each occasion, no inflection point was observed in the curves of voltage change with respect to time of the second and subsequent cycles.

(Regarding Graphite-Graphite System)

In test cell 1-1 which uses graphite of the present invention for the positive electrode and the negative electrode, the potential at which adsorption occurs as measured on the basis of the oxidation-reduction potential of hydrogen was 1.6 V in the positive electrode side and −1.8 V in the negative electrode side. The cell capacitance was about 80 F/g, which is a capacitance miraculously high as an electric double layer capacitor.

In the graphite of the present invention, it is considered that a special electric double layer is formed in the course of charging and, therefore, it is likely that such a large electrostatic capacitance was developed.

On the other hand, in test cells 1-2 to 2-5, in which it was likely that no cation was adsorbed in the course of charging, no development of capacitance sufficient for practical use was observed. Also in the cases where graphite electrodes 2 to 5 were used as positive electrodes and combined with an activated carbon electrode, no sufficient capacitance was developed in the positive graphite electrodes.

When a negative electrode was made of graphite and triethylmethylammonium was used for an electrolytic solution, no sufficient capacitance was developed, whereas when spiro-(1,1')bipyrrolidinium was used, a capacitance was developed.

Molecular models of both the electrolytes were formed and the difference between them was investigated on the basis of molecular orbital calculation.

FIG. 8 is diagrams which demonstrates minimum projection planes on which the molecular models of spiro-(1,1')bipyrrolidinium and triethylmethylammonium are projected, with minimum areas, perpendicularly to the sheet plane.

FIG. 8(A) shows spiro-(1,1')bipyrrolidinium, and FIG. 8(B) shows triethylmethylammonium.

FIG. 9 is diagrams which demonstrates maximum projection planes on which the molecular models of spiro-(1,1')bipyrrolidinium and triethylmethylammonium are projected, with maximum areas, perpendicularly to the sheet plane.

FIG. 9(A) shows spiro-(1,1')bipyrrolidinium, and FIG. 9(B) shows triethylmethylammonium.

Calculation of the longitudinal and lateral steric interatomic distances of each compound showed that the distances were 0.4216 nm and 0.4212 nm for spiro-(1,1')bipyrrolidinium, and 0.6137 nm and 0.4239 nm for triethylmethylammonium.

From these results, it is assumed that the steric hindrance of a moiety larger than 0.6 nm in triethylmethylammonium affects the appearance of capacitance.

The molecular mechanics calculation was conducted with using Tinker ver. 3.8, and the interatomic distances were calculated under potential parameter=mm3 and RMS=0.01. The molecular orbital calculation was conducted with using Mopac ver. 2.6 and specifying PM3 as the Hamiltonian.

From these results, in the case of a molecule having a minimum projection area of an interatomic distance, excluding the spread of electron clouds, of 0.7 nm or less, it is assumed that ions will be adsorbed due to disorder of the crystal in the surface of graphite, so that a capacitance will be developed.

FIG. 10 is a diagram which illustrates a molecular model of trimethylhexylammonium: FIG. 10(A) shows a diagram viewing a minimum projection plane on which the area projected perpendicularly to the sheet plane is minimum; and FIG. 10(B) shows a diagram viewing the maximum projection plane.

Trimethylhexylammonium is of a greater solubility than tetramethylammonium and therefore is a desirable electrolytic solution. It is a substance resulting from replacement of part of the chemical structure of tetramethylammonium, which is an equilateral triangular pyramid with each edge 0.424 nm long.

Thus, a substance resulting from replacement of one of the methyl groups of tetramethylammonium by an alkyl group having from 2 to 10 carbon atoms is effective.

FIG. 11 is a diagram which illustrates a molecular model of ethylmethylimidazolium: FIG. 11(A) shows a diagram viewing a minimum projection plane of ethylmethylimidazolium; and FIG. 11(B) shows the maximum projection plane.

Although the steric interatomic distance of the minimum projection plane of ethylmethylimidazolium is as small as 0.3005 nm, it is assumed that it can not be used because it will decompose at or below the potential where adsorption occurs.

FIG. 12 is a diagram which illustrates a molecular model of a $BF_4$ anion.

Based on the result of calculation similar to that previously described, it is an equilateral triangular pyramid with each edge 0.206 nm long. In a similar manner, it is assumed that $ClO_4$ is an equilateral triangular pyramid with each edge 0.208 nm long and that $PF_6$ is a regular octahedron with each edge 0.25 nm long. For this reason, it is expected that a capacitance will be developed satisfactorily.

(Graphite-Activated Carbon/Nonporous Carbon System)

In use of a carbon electrode of the present invention for the positive electrode side and a polarizable carbon electrode made of activated carbon or nonporous carbon for the negative electrode side, when the electrostatic capacitances of the electrodes of the positive electrode side and the negative electrode side were measured individually and the change in combined capacitance with increase in the volume of the negative electrode side was measured, the increase in capacitance stopped when the activated carbon electrode was increased to 5 times the graphite electrode in test cells 4-1 to 7-4. For nonporous electrodes, the capacitance did not increase any more when it was increased to 3 times the graphite electrode.

On the other hand, the single electrode capacitance, under the same measurement conditions, of an activated carbon electrode used for the negative electrode of the present invention was about 50 F/g and the single electrode capacitance of a nonporous electrode was about 80 F/g. From this, it is assumed that when the same electrolytic solution is used, the single electrode capacitance in the case of using a graphite electrode for the positive electrode will be very high as about 240 to 250 F/g.

Also when a graphite electrode was used as a negative electrode and a polarizable carbon electrode made of activated carbon or nonporous carbon was used in the positive electrode side, results similar to those mentioned above were obtained as shown in test cells 8-1 to 9-4.

Therefore, when a graphite electrode of the present invention is used in combination with such activated carbon and a nonporous electrode, it is possible to reduce the volume of the graphite electrode, which has a smaller capacitance per unit volume in comparison to use of only activated carbon or nonporous electrode. It, therefore, is possible to obtain an electric double layer capacitor having a volume energy density larger than those of electric double layer capacitors having only an electrode of activated carbon or nonporous carbon.

(Durability Test)

A cycle test was carried out in order to prove the durability of an electric double layer capacitor using the graphite. Charging and discharging were repeated using a charging/discharging current of 20 mA at 25° C. and a terminal voltage of 3.5 V and the rate of change from an initial capacitance was measured. Cells illustrated in FIG. 2 were used in experiments and the experiments were conducted using the constitution shown as cell No. 1-1 in Table 2. As shown by numbers 11 and 15 in FIG. 2, aluminum is used for the collecting electrodes of the cell. In the experiments, besides untreated aluminum (untreated), collecting electrodes prepared by treating the surface of aluminum with hydrochloric acid to increase the surface area to about 10 times (etching treatment) and electrodes (etching treatment+carbon treatment) prepared by applying colloidal carbon (AQUADAG manufactured by Acheson (Japan) Ltd.) to the collecting electrodes were prepared.

The results are shown in Table 3.

From this result, it is assumed that in electric double layer capacitors using the graphite, a sufficient durability is obtained by use of etched aluminum as a collecting electrode(s) and preferably by providing a layer made of carbon other than claim 1 on the aluminum and forming thereon an electrode made of the graphite. Also when Cu113220 copper (manufactured by NIERECO Corporation) was used as a collecting electrode of a negative electrode, an effect equivalent to that in the case of subjecting aluminum to etching treatment was obtained.

TABLE 3

Cycle test

Capacitance changing rate (%)

| Number of cycle(s) | Untreated | Etching treatment | Etching treatment + carbon treatment | Cathode: copper |
|---|---|---|---|---|
| 0 | 100 | 100 | 100 | 100 |
| 100 | 87 | 90 | 95 | 93 |
| 500 | 84 | 89 | 94 | 91 |
| 1000 | 80 | 88 | 93 | 89 |
| 2000 | 75 | 87 | 91 | 88 |

(Electrode Density)

In electric double layer capacitors using the graphite, the influences of the electrode density to the capacitance and the resistance were investigated. In preparation of Example 1-graphite electrode 1, graphite electrodes different in electrode density was prepared by changing the electrode molding pressure. These were assembled into cells with a constitution the same as that of cell 1-1 in Table 2. Then, a charging current was applied with a constant current of 5 mA, and at arrival at 3.2 V, switch to a constant voltage was made. Following the charging for 2 hours in total, discharging was conducted at 5 mA to 2 V and the electrostatic capacitance and resistance of the test cell were measured. The results are shown in Table 4. From the results of the experiments, it is assumed that the electrode density in the graphite electrode at a large current is from 0.6 to 1.5 g/CC and preferably about from 0.7 to 1.4 g/CC. At a small electric power of 0.5 mA, it can be used over 1.6 g/cc.

When activated carbon or nonporous carbon is used for a counter electrode, it is assumed that the electrode density of the activated carbon or nonporous electrode is from 0.6 to 1.0 g/CC, and preferably about from 0.7 to 0.9 g/CC.

TABLE 4

Initial charging/discharging test

| Electrode density (g/CC) | Capacitance (F/CC) - 5 mA | Capacitance (F/CC) - 0.5 mA |
|---|---|---|
| 0.71 | 63.44 | 69.88 |
| 0.83 | 78.92 | 82.64 |
| 0.88 | 81.23 | 87.21 |
| 1.02 | 48.22 | 91.23 |
| 1.25 | 21.93 | 90.33 |
| 1.41 | 1.225 | 72.34 |
| 1.62 | 0.52 | 62.11 |
| 1.83 | 0.11 | 41.21 |

(Durability Test 2)

In a combination of positive electrode: graphite 1 and negative electrode: nonporous 4, a cell was prepared and subjected to a cycle test for examination of the durability of the cell. Regarding the conditions for the test, a cycle including charging with a constant current of 5 mA to 3.5 V, holding for 1 hour, and discharging at 5 mA under a 25° C. environment was repeated.

The results are shown in Table 5.

TABLE 5

After 1000 cycles

| Electrolytic solution | Capacitance degrading rate (%) | Resistance increasing rate (%) |
|---|---|---|
| PliPPBF4/PC | -8.2 | 11.3 |
| PliPPPF6/PC | -6.3 | 7.8 |
| PliPPBF4/PC:EC(50:50) | -5.8 | 9.3 |
| PliPPPF6/PC:EC(50:50) | -4.3 | 5.5 |
| SBPBF4/PC | -8.7 | 11.8 |
| SBPPF6/PC | -6.8 | 8.3 |
| SBPBF4/PC:EC(50:50) | -6.2 | 9.6 |
| SBPPP6/PC:EC(50:50) | -4.9 | 5.9 |

The results given in Table 5 show that use of $PF_6$ leads to better durability than use of $BF_4$ does and that use of a mixed solvent of PC and EC results in better durability than use of only PC does.

(Solubility and Resistance)

Next, in a combination of positive electrode: graphite 1 and negative electrode: activated carbon 4, a cell was prepared and subjected to examination of the influence of the solute concentration to the cell resistance. Charging was conducted at a temperature of 25° C. with a constant current of 5 mA to 3.5 V. After holding for 1 hour, discharging was conducted at 5 mA. The resistance was determined from the initial voltage change. The results are shown in Table 6.

TABLE 6

| Electrolytic solution | Maximum dissolved molar concentration (M/L) | Concentration (M/L) at which minimum resistance is shown | Minimum resistance (Ω) |
|---|---|---|---|
| PliPPBF4/PC | 3.1 | 2.1 | 4.68 |
| PliPPPF6/PC | 3.3 | 2.2 | 4.57 |
| SBPBF4/PC | 2.9 | 2.3 | 4.44 |
| SBPPF6/PC | 2.8 | 2.3 | 4.31 |
| PliPPBF4/PC:EC(50:50) | 3.3 | 2.2 | 4.22 |
| PliPPPF6/PC:EC(50:50) | 3.4 | 2.1 | 4.09 |
| SBPBF4/PC:EC(50:50) | 3.1 | 2.2 | 4.29 |

TABLE 6-continued

| Electrolytic solution | Maximum dissolved molar concentration (M/L) | Concentration (M/L) at which minimum resistance is shown | Minimum resistance (Ω) |
|---|---|---|---|
| SBPPP6/PC:EC(50:50) | 3.0 | 2.3 | 4.01 |
| PliPPBF4/PC:DEC(50:50) | 1.9 | 1.6 | 3.53 |
| PliPPPF6/PC:DEC(50:50) | 2.1 | 1.5 | 3.55 |
| SBPBF4/PC:DEC(50:50) | 1.7 | 1.4 | 4.02 |
| SBPPP6/PC:DEC(50:50) | 1.9 | 1.5 | 4.44 |
| PliPPBF4/EC:DEC(50:50) | 2.1 | 1.4 | 3.81 |
| PliPPPF6/EC:DEC(50:50) | 2.2 | 1.5 | 3.77 |
| SBPBF4/EC:DEC(50:50) | 1.8 | 1.5 | 3.93 |
| SBPPP6/EC:DEC(50:50) | 2.0 | 1.5 | 3.91 |

Temperature: 30° C.

The results given in Table 6 show that use of PliPP leads to a higher solubility and a lower resistance than use of SBP does. Regarding solvent, EC or a mixed solvent of EC and DEC leads to decrease in resistance in comparison to PC only. Particularly, a mixed solvent of EC and DEC leads to decrease in resistance by 30% in comparison to PC only.

INDUSTRIAL APPLICABILITY

The present invention uses graphite whose voltage curve has an inflection point at the time of charging with a constant current and therefore a large electrostatic capacitance is developed in a charging process. It, therefore, is possible to provide an electric double layer capacitor which can work at a high speed and which has a large capacitance and a high withstanding voltage by use in combination, as counter electrodes, of a polarizable carbon electrode in an amount suitable for capacitance, such as a polarizable electrode made of graphite or activated carbon.

The invention claimed is:

1. An electric double layer capacitor comprising a carbonaceous positive electrode comprising graphite and a carbonaceous negative electrode, immersed in an electrolytic solution obtained by making a solute dissolved in a nonaqueous solvent, wherein
the electrolytic solution includes no lithium ion, and
the graphite has a rhombohedral crystal-to-hexagonal crystal ratio (lb/la ratio) determined by X-ray diffractometry of 0.3 or more.

2. The electric double layer capacitor according to claim 1, wherein the carbonaceous negative electrode is a carbonaceous negative electrode comprising graphite.

3. The electric double layer capacitor according to claim 1, wherein the graphite has a BET surface area of from 10 to 300 m²/g.

4. The electric double layer capacitor according to claim 1, wherein the graphite has an l(1360)/l(1580) ratio determined by Raman spectroscopy within the range of from 0.02 to 0.30.

5. The electric double layer capacitor according to claim 1, wherein the solute is at least one electrolyte selected from the group consisting of a tetrafluoroborate salt of an quaternary ammonium and its derivatives, and a hexafluorophosphate salt of an quaternary ammonium and its derivatives.

6. The electric double layer capacitor according to claim 5, wherein the quaternary ammonium is the pyrrolidinium compound represented by the formula:

[Chem 1]

wherein R is each independently an alkyl group having from 1 to 10 carbon atoms or R and R form together an alkylene group having 3 to 8 carbon atoms.

7. An electric double layer capacitor, wherein at least one electrode comprises graphite of which changing rate in voltage turns smaller than a voltage changing curve based on a time constant through intake of ions in the electrolytic solution into the graphite in the course of charging at the time of charging with a constant current, and wherein charging/discharging is performed through adsorption and desorption of the ions, wherein
the electrolytic solution includes no lithium ion, and
the graphite has a rhombohedral crystal-to-hexagonal crystal ratio (lb/la ratio) determined by X-ray diffractometry of 0.3 or more.

8. The electric double layer capacitor according to claim 7, wherein both the positive electrode and the negative electrode comprise graphite of which changing rate in voltage turns smaller than a voltage changing curve based on a time constant through intake of ions in the electrolytic solution into the graphite in the course of charging at the time of charging with a constant current.

9. The electric double layer capacitor according to claim 7, wherein at least one electrode is composed of a carbon electrode comprising graphite-like microcrystalline carbon of which electrostatic capacitance has been developed through insertion of ions at a first charging, and the carbon therefore showing a voltage changing curve based on a time constant at a second and subsequent charging with a constant current.

10. An electric double layer capacitor, wherein at least one electrode is composed of an electrode made of graphite of which changing rate in voltage turns smaller than a voltage changing curve based on a time constant through intake of ions in the electrolytic solution into the graphite in the course of charging at the time of charging with a constant current, and the counter electrode comprises activated carbon, wherein
the electrolytic solution includes no lithium ion, and
the graphite has a rhombohedral crystal-to-hexagonal crystal ratio (lb/la ratio) determined by X-ray diffractometry of 0.3 or more.

* * * * *